United States Patent
Goergens et al.

(10) Patent No.: US 10,691,691 B2
(45) Date of Patent: Jun. 23, 2020

(54) ITERATIVE EVALUATION OF DATA THROUGH SIMD PROCESSOR REGISTERS

(71) Applicant: SAP SE, Walldorf (DE)

(72) Inventors: Maik Goergens, Nussloch (DE); Dominik Durner, Schrobenhausen (DE)

(73) Assignee: SAP SE, Walldorf (DE)

( * ) Notice: Subject to any disclaimer, the term of this patent is extended or adjusted under 35 U.S.C. 154(b) by 827 days.

(21) Appl. No.: 15/261,883

(22) Filed: Sep. 10, 2016

(65) Prior Publication Data
US 2018/0074821 A1    Mar. 15, 2018

(51) Int. Cl.
| | |
|---|---|
| G06F 16/00 | (2019.01) |
| G06F 16/2455 | (2019.01) |
| G06F 16/22 | (2019.01) |
| G06F 8/41 | (2018.01) |
| G06F 16/242 | (2019.01) |
| G06F 9/30 | (2018.01) |
| G06F 12/0875 | (2016.01) |

(52) U.S. Cl.
CPC .......... *G06F 16/2455* (2019.01); *G06F 8/453* (2013.01); *G06F 9/3013* (2013.01); *G06F 9/30036* (2013.01); *G06F 12/0875* (2013.01); *G06F 16/221* (2019.01); *G06F 16/2425* (2019.01); *G06F 2212/452* (2013.01)

(58) Field of Classification Search
CPC .......... G06F 16/2455; G06F 16/24549; G06F 16/24554
USPC ......................................................... 707/713
See application file for complete search history.

(56) References Cited

U.S. PATENT DOCUMENTS

| | | | |
|---|---|---|---|
| 9,703,768 B1* | 7/2017 | Graham | G06F 16/245 |
| 2005/0027701 A1* | 2/2005 | Zane | G06F 8/30 |
| 2013/0151567 A1* | 6/2013 | Ellison | G06F 9/3887 |
| | | | 707/802 |
| 2014/0280283 A1* | 9/2014 | Li | G06F 16/24532 |
| | | | 707/764 |

(Continued)

OTHER PUBLICATIONS

Christian Bockermann, Learning SQL for Database Instrusion Detection using Context-Sensitive Modelling, DOI, 10.17877/DE290R-2052 (Year: 2009).*

(Continued)

*Primary Examiner* — Thu Nguyet T Le
(74) *Attorney, Agent, or Firm* — Buckley, Maschoff & Walwalkar LLC (57) ABSTRACT

Executable code is generated for processing a data set in an in-memory database system. The executable code is based on program instructions including a predicate associated with a first part of the data set. The first part of the data set is divided into data sections. A data section comprises a number of data elements corresponding to a number of bit values to be allocated into a register at a processor. The register at the processor is associated with performing single instructions on multiple data. At the processor, the data sections are evaluated iteratively to determine bit vectors to be stored iteratively into the SIMD register. Based on the iteratively stored bit vectors at SIMD register at the processor, result data sets are iteratively determined through invoking data from the data set. The result data sets are provided through the processor for further consumption.

20 Claims, 8 Drawing Sheets

(56) References Cited

U.S. PATENT DOCUMENTS

2015/0154255 A1  6/2015  Cole et al.

OTHER PUBLICATIONS

European Extended Search Report to EP Application No. 17001275.1; completed Dec. 5, 2017; Munich; 8 pages.
Thomas Willhalm et al; "Vectorizing Database Column Scans with Complex Predicates"; Conference: ADMS, At Riva del Garda, Italy, 2013; appears in vol. 2014; 12 pages; (http://www.adms-conf.org/2013/muller_adms13.pdf).
Maik Goergens et al.; "Loading Data For Iterative Evaluation Through SIMD Registers"; Utility U.S. Appl. No. 15/261,886, filed Sep. 10, 2016; 59 pages.

\* cited by examiner

ITERATIVE EVALUATION OF DATA THROUGH SIMD PROCESSOR REGISTERS

FIELD

The field generally relates to data processing, to database systems and computer processors.

BACKGROUND

A computer program can be written in a form of programming language, including compiled or interpreted languages. The computer program can be deployed as a stand-alone program or as a module, or other unit suitable for use in a computing environment. The computer program can be deployed to be executed on a computer or distributed across multiple computers interconnected by a communication network. Operations may be performed by one or more programmable processors executing the computer program to perform functions by operating on associated data and generating output.

Sets of data and program instructions (e.g. software, computer programs) may be stored on storage units and reside within the main memory and/or within the processor during execution by a computer system. Processing program instructions on the computer system includes manipulations and transformations of data within the processor registers and memory into other data, similarly represented as physical quantities within the memory or registers or other information storages. Program instructions may be based on defined queries for data stored in databases on the computer system. A query statement may be used to query the database and retrieve selected data that match specified criteria. A processor register is a quickly accessible location available for the processor on the computer system. Registers usually include an amount of fast storages, they may have specific hardware functions, and/or the access to the registers may be restricted, e.g. read-only, write-only, etc.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for iterative evaluation of data through processor registers are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
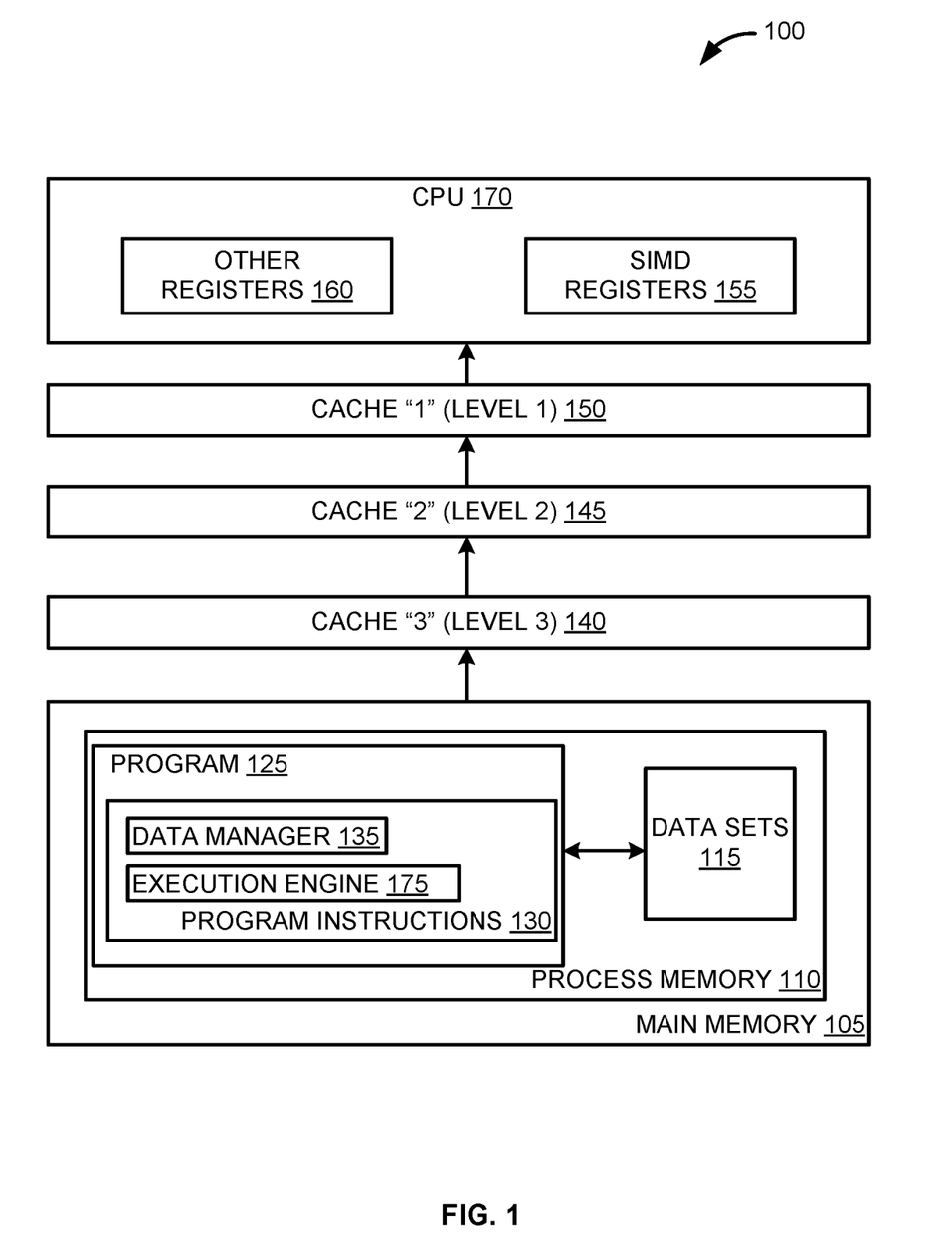
FIG. 1 is a block diagram illustrating an exemplary environment for evaluating data associated with a program in an in-memory database system, according to one embodiment.

FIG. 1 is a block diagram illustrating an exemplary environment 100 for evaluating data associated with a program in an in-memory database system, according to one embodiment. The exemplary environment 100 includes main memory 105, cache memory, and a central processing unit (CPU) 170. The main memory 105 may store instructions and data, which may be associated with one or more programs for execution in the in-memory database system. Program 125 is defined to run on process memory 110 in the main memory 105. The process memory 110 is managed by an underlying operating system (OS) (not illustrated) running in the exemplary environment 100. The program 125 may be a software program, which may be designed and developed with different development tools and techniques. The program 125 includes program instructions 130. The program 125 may be associated with operations defined in the program instructions 130 that are related to data sets 115. The data sets 115 may be stored in a database table. The program instructions 130 include a data manager 135 and an execution engine 175. The data manager 135 maintains data, which is generated through the execution of the program instructions 130 by the execution engine 175. The data manager 135 may be used when loading data, where the data is referred to from the program instructions 130 and/or when utilizing data, required for the execution of instructions. The execution engine 175 generates code during runtime based on the program instructions 130. The generated code defines how data from data set 115 is processed through a register associated with single instructions on multiple data (SIMD register) 155 of the CPU 170.

In one embodiment, the program instructions 130 may define operations for querying data to generate a result data set. For example, the instructions may be defined based on a request defining a query. The query is defined as a query string in a query language, e.g. Structured Query Language (SQL) to manage data held in databases. Table 1 presents an exemplary request for querying data from a database table—table "T", designed in SQL. Table 2 presents the data stored in the database table "T". The presented request as an SQL string may be associated with a program, such as the program 125. The program 125 processes the received request with the SQL string.

TABLE 1

Select a
From T
Where b> 100;

TABLE 2

| a | b | c |
|---|---|---|
| 14 | 5 | Product 1 |
| 21 | 3 | Product 2 |
| 13 | 101 | Product 3 |
| 16 | 90 | Product 1 |
| 14 | 102 | Product 3 |

The defined program instructions 130 in the program 125 may be evaluated and executed. For example, if the program instructions 130 are associated with the SQL string presented in Table 1, then when executing the program 125, the data set 115 is filtered based on the values for column "b". The execution engine 175 generates an executable program based on the program 125 that performs the filtering over the values for column "b" to determine a result set of data from the values from column "a". If the instructions are related to the data set presented in Table 2, then column "b" may be filtered based on the predicate "b>100" as defined in the where clause. Values from column "a" corresponding to values from column "b", which comply with the predicate, are determined. The result data includes the values "13" and "14" of column "a" corresponding to values "101" and "102" from column "b", which are higher than 100.

In one embodiment, when executing the program instructions 130 from the program 125, cache memory for the CPU 170 is used to store program instructions or data that are frequently referenced by program 125 during operation. Fast access to these instructions and data increases the overall speed of the program execution. The CPU 170 may be associated with cache memory in three cache levels—cache "1" 150, cache "2" 145, and cache "3" 140. The CPU 170 includes registers, including single instruction multiple data (SIMD) registers 155 and other registers 160. The registers are quickly accessible locations available to the CPU 170. The registers may hold values transferred from the main memory 105 through the cache memory levels—cache "3" 140, cache "2" 145, and cache "1" 150, to reach the registers. Data in the registers may be stored while executing program instructions, such as program instructions 130.

The SIMD registers 155 are associated with performing single instructions on multiple data elements in parallel. Therefore, within such SIMD registers 155, a common operation as defined in the program instructions (e.g., 130) is performed on multiple data elements simultaneously, instead of iterating in a scalar manner over lines in a table.

The other registers 160 may store values generated based on program instructions, defining data iteration in a scalar manner.

Figure 2A:
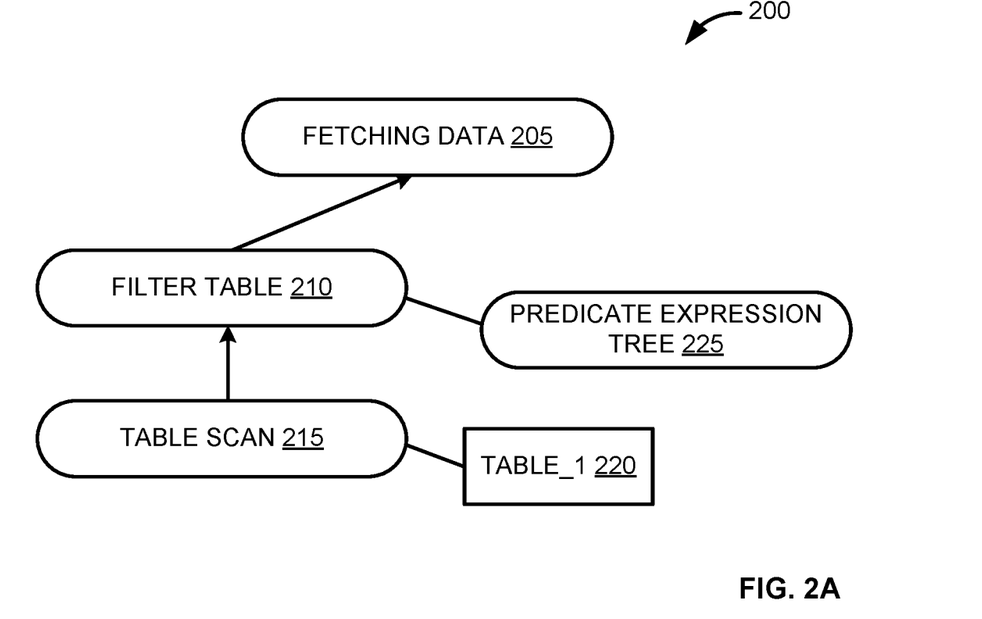
FIG. 2A is a flow diagram illustrating a process for logically evaluating program instructions from a program executed in an in-memory database system, according to one embodiment.

FIG. 2A is a flow diagram illustrating a process 200 for logically evaluating program instructions from a program executed in an in-memory database system, according to one embodiment. In one embodiment, the program may be such as the program 125, FIG. 1. The program may include program instructions defining operations associated with manipulating and/or evaluation data from data sets. The program instructions may be associated with operating over data stored in database tables. The program instructions may be associated with a request for querying data from a database table. Based on the instructions, a table scan operation 215 is performed in relation to table_1 220. For example, the table_1 220 may be such as table "T" discussed in relation to FIG. 1 and represented in Table 2 above. The program instructions may be associated with an SQL string defining a query for table "T", with a defined "where" clause. The program instructions may be associated with the SQL string presented in Table 1. Based on the program instructions, the table_1 220 is filtered at 210, according to the program instructions.

The program instructions may include expressions to be applied for evaluating the data in table_1 220, for example to filter the data. With the example of the SQL string from Table 1 and table_1 220 corresponding to Table 2, the "where" clause filters rows from the table_1 220, where "b" values are greater than 100. The filter table 210 step is associated with a predicate expression tree 225. The predicate expression tree 225 may be generated based on evaluation of the instructions defined in the program. The expression tree may represent program instructions in a tree-like data structure, where nodes represent method call, binary operations, data values, etc. The expression tree may be a binary tree where internal nodes correspond to operators and leaf nodes correspond to operand. Based on the filtering (at 210), data corresponding to the defined program instructions is fetched at 205. Therefore, the defined data flow in the process 200 is defined from the bottom of the process to the top, starting with the table scan 215 and ending with the fetching data 205.

Figure 2B:
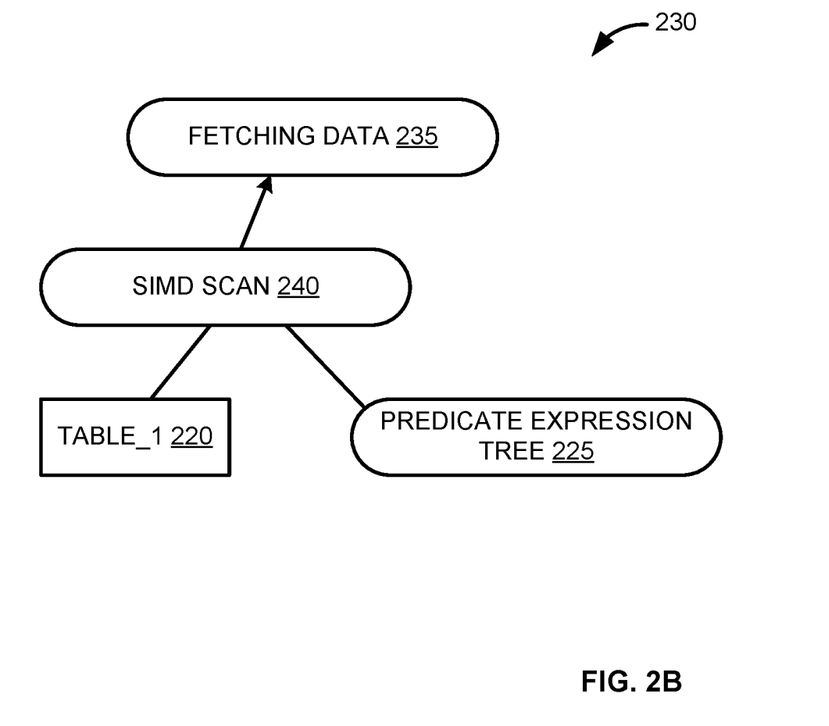
FIG. 2B is a flow diagram illustrating a process for plan generation for executing program instructions from a program, according to one embodiment.

FIG. 2B is a flow diagram illustrating a process 230 for plan generation for executing program instructions from a program, according to one embodiment. Based on the process 200 defining a logical plan for evaluation of program instructions from a program, the plan for execution of the program instructions is generated. When executing the program instruction from the program, registers from the CPU may be utilized to enhance the performance of the program. The registers may be SIMD registers, such as the SIMD registers 155 (FIG. 1). To utilize the SIMD registers, the process 230 may be defined for code generation that allocates processed data into the SIMD registers. A SIMD scan 240 may be defined for table_1 220 (as described in process 200). The SIMD scan 240 corresponds to the predicate expression tree 225 defined for the operations from the program instructions. Based on the SIMD scan 240, fetching of data 235 is performed. The fetching of data is processed in a SIMD manner, so that fetched data is processed into correspondingly defined SIMD registers. SIMD registers allow one microinstruction to operate at the same time on multiple data items, for example on multiple data values from multiple rows in a database table. What usually requires a repeated succession of instructions can be performed with one instruction to enhance the performance and computation time.

Figure 3:
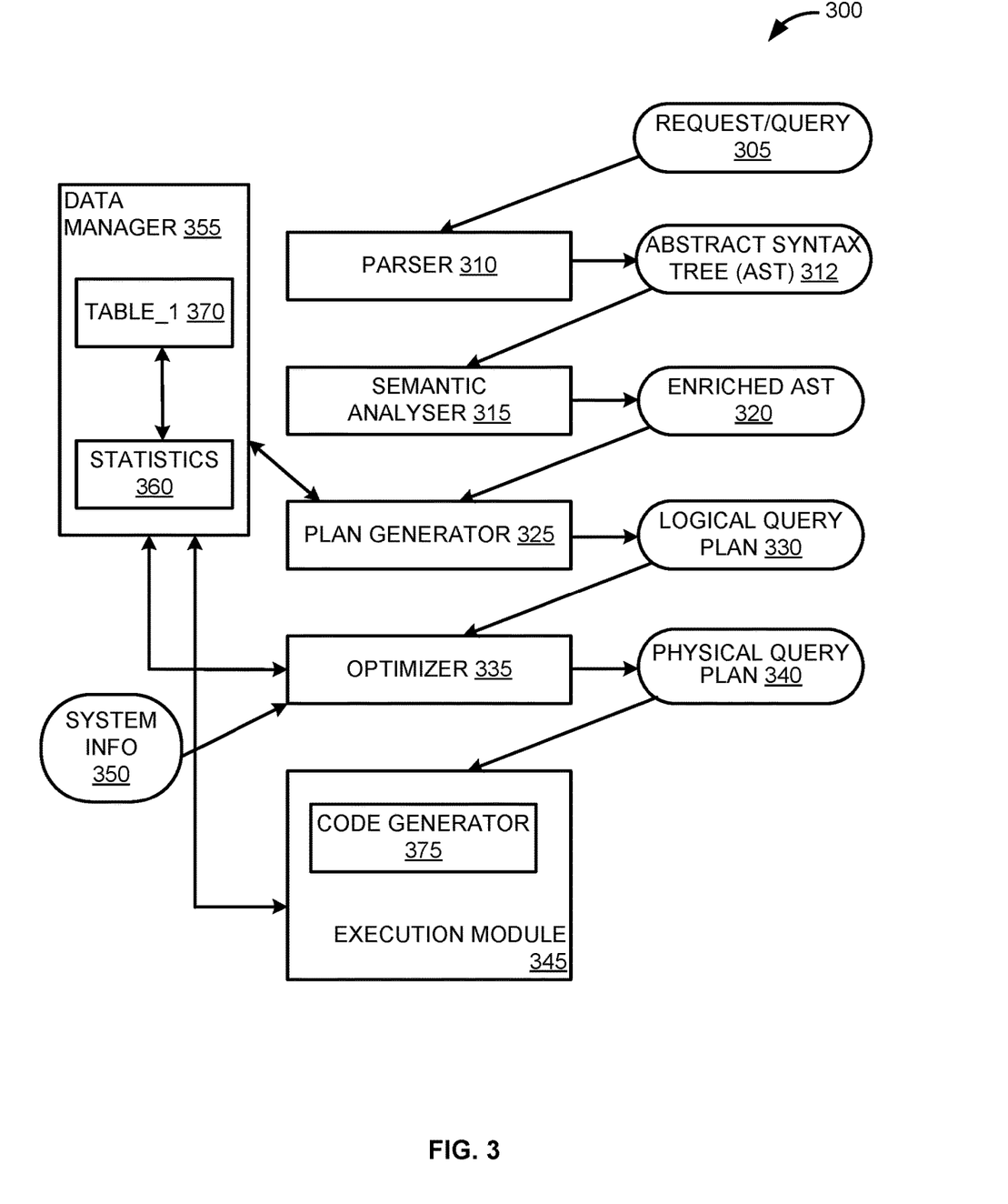
FIG. 3 is a flow diagram illustrating a process for evaluation of a request to be executed in an in-memory database system, according to one embodiment.

FIG. 3 is a flow diagram illustrating a process 300 for evaluation of a request 305 to be executed in an in-memory database system, according to one embodiment. The request 305 may be a query associated with a data set in the in-memory database system. Based on such a request a program, such as program 125, FIG. 1 may be defined. The request 305 may include expressions defining generation of results based on the associated data sets, for example stored in a database table. The request 305 may be associated with a table_1 370. The table_1 370 may include data, such as the data presented in Table 2. The request 305 may include an SQL query for data in table_1 370, which query may include predicates and expressions defining rules for generating result data through querying the table_1 370. The SQL query may be such as the SQL query presented in Table 1. The request 305 is received as statements by the parser 310. The request 305 is read and analyzed by the parser 310 to generate an abstract syntax tree (AST) 312. In the AST 312, statements from the request 305 are logically divided and located into a tree structure positioning operands and operators along tree branches.

The parser 310 sends the generated AST 312 to a semantic analyzer 315, which generates an enriched abstract syntax tree (AST) 320. The semantic analyzer 315 validates the received AST 312 from the parser 310 in the context of the defined table_1 370. The validation of the AST 312 includes determination of whether the defined operands and operators are logically constructed to be validly performed over the data from table_1 370. Based on the validation, the semantic analyzer 315 updated the AST to generate the enriched AST 320, which additionally includes metadata for the data in the table_1 370. For example, the enriched AST 320 may include information about the number of rows in the table_1 370, the type of data stored in a specific column from the table_1 370, etc. A plan generator 325 received the enriched AST 320 from the semantic analyzer 315 to generate a logical query plan 330 for the request 305. The plan generator 325 takes the enriched AST 320 and translates it into a logical query plan 330 defining steps based on the enriched AST 320. The logical query plan 330 may correspond to the process 200, FIG. 2, where table_1 220 corresponds to table_1 370.

Based on the defined logical query plan 330, an optimizer 335 determines a physical query plan 340. In an example, the determined physical query plan 340 may be interpreted to generate a result data set. In another example, the determined physical query plan 340 may be used for code generation for execution of the request 305. The optimizer 335 is coupled to the data manager 355 to receive information about the data stored in table_1 370. The optimizer 335 receives statistics 360 for the data from table_1 370 through the data manager 355. For example, such statistics 360 include minimum and/or maximum values for data in a column, a number of rows in a table, a number of columns in a table, and other statistical indicators for the data in table_1 370. Further, the optimizer 335 receives system information 350 about the system environment, where the program instructions 305 are to be executed. In such manner, the optimizer 335 receives information about the capabilities of the engine, where the program instructions 305 are executed, and information about the data, which will be processed according to the program instructions 305. The optimizer 335 may generate a set of physical plans, based on the received system information 350 and the statistics 360. A plan from the set of physical query plans may be a code generation plan. The optimizer 335 may determine an optimal physical plan for code generation, based on the input from the data manager 355 and the system info 350.

The physical query plan 340 for code generation may be provided from the optimizer 335 to an execution module 345, which may execute runtime generated program instructions defined by a code generator 375. The execution module 345 performs the operations defined by the request 305 and transfers data from table_1 370 from the main memory of the in-memory database system through the cache memory levels and up to the SIMD registers in the processor, as described in relation to FIG. 1.

The execution module 345 includes the code generator 375, which may generate executable code in compiled form for the received request 305 that utilize SIMD registers, such as the SIMD registers 155, FIG. 1, while processing data from table_1 370. The code generator 375 may define how data from table_1 370 may be evaluated based on operations and predicates defined in the request 305. The code generator 375 utilized the physical query plan 340, provided by the optimizer 335 to generate code during runtime, which defined what kind of registers from the processor to be used during processing data as defined in the request 305. A code generation plan may be designed to optimize the allocation of data into register, and may further define to utilize SIMD registers to increase performance of the execution of the program.

When the code generator 375 is associated with utilizing SIMD registers for processing data, then the generated code may further define how to separate and divide the processed data to optimize the execution of the process. The program instructions 305 may define operations associated with a large amount of data stored in table_1 370, which may not be processed at once through the SIMD registers at the processor. Therefore, the data from table_1 370 may be processed in subsets, which subsets may be defined as sections of rows. These subsets or sections may be defined to correspond in size to the size of SIMD registers. Therefore, the size of the SIMD registers may be determined and received as part of the system information 350. In some embodiments, the optimizer 335 may determine the size. In some other embodiments, the optimizer 335 may check to determine whether a SIMD register exists and if it is available. The code generator 375 may be used to determine the size of the SIMD registers and select which SIMD registers are to be used.

The code generator 375 may generate code during runtime that utilizes memory of SIMD registers. Table 3 includes exemplary pseudo runtime generated code based on a received SQL string, such as the SQL string in Table 1, associated with a table, such as Table 2. For the example in Table 3, it is assumed that the size of a SIMD register is 256 bits. Therefore, the iteration are performed over sections "i" including 256 numbers each. The Pseudo code example is defined as an artificial and informal language that helps understanding the code generation. Pseudo code is a "text-based" detail algorithmic design of the runtime generated code.

TABLE 3

```
int *a;
int *b;
for (i = in 256 number sections)
{
    for ( # of simd_passes)
    {
        load (b -> simd_register)
```

TABLE 3-continued

```
    compare_gt ( simd_register, 100);
    // bit vector of length 8 bits
    // store in result_vec at right position
    }
    for (j= ones in bitvector)
    {
        calculate original row_id = i* 256 + j;
        return_to_user (a[row_id]);
    }
}
```

Figure 4:
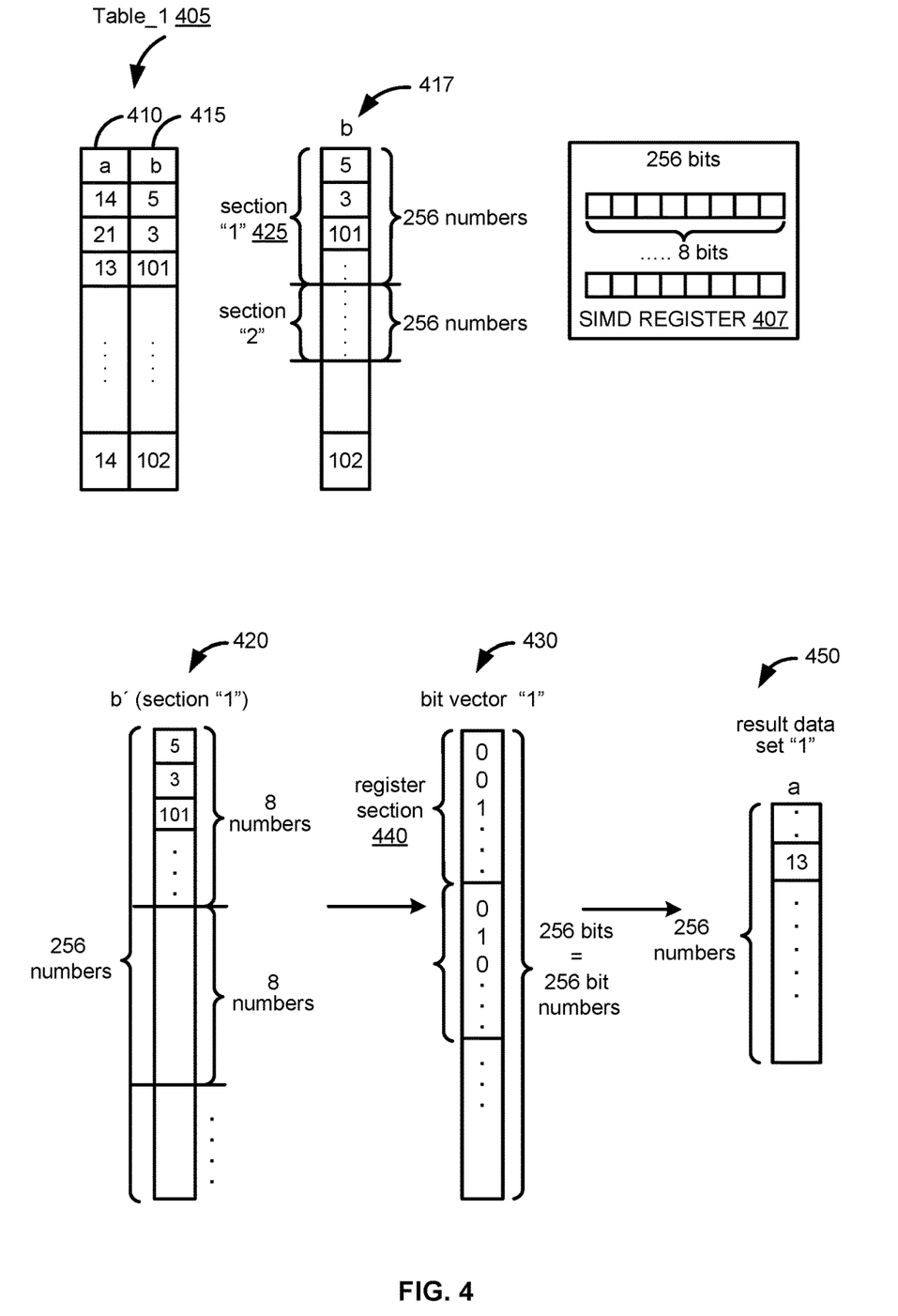
FIG. 4 is a block diagram illustrating exemplary data structures associated with a process for evaluating a request related to a data set through iterating over sections of the data set within registers at a computer processor, according to one embodiment.

FIG. 4 is a block diagram illustrating exemplary data structures associated with a process for evaluating a request related to a data set through iterating over sections of the data set within registers at a computer processor, according to one embodiment. Table_1 405 is a table including data for column "a" 410 and column "b" 415. Table_1 405 may be similar to Table 2 presented above in relation to FIG. 1, but including column "a" and column "b" without column "c".

The request may include one or more queries for table_1 405. For example, a query may be such as the query defined in Table 1. Based on querying the data in table_1 405, values from column "a", where values in "b" are greater than 100 can be determined. The defined request may be evaluated to determine a code generation plan, as discussed in relation to FIG. 3. The code generation plan may define that values from column "b" are evaluated in sections through process registers to optimize the performance. The process registers may be associated with performing single instructions on multiple data (SIMD). The values from column "b", as presented in array 410, may be evaluated iteratively into sections based on a predicate defined in the program instructions for evaluating the data. In the exemplary query from Table 1, the predicate is defined in the where clauses—"b>100". The array 410 of values from column "b" may be divided into sections. The section size may correspond to the size of a SIMD register 407 at the computer processor of the computer system, where the program is executed. The size of the SIMD register 407 may be determined. For example, it may be assumed that the values from column "b" are 32 bit numbers and the SIMD registers may have a set of register sections of 8 bits to define a register of a size of 256 bits. In the SIMD register 407 of 256 bits, 256 bit values may be included, which may correspond to an evaluation result for 256 numbers from the array 410 based on the predicate defined in the program instructions, namely "b>100".

A set of sections, where a section includes 256 numbers, may be defined for array 417. For example, the values from array 417 are 32 bit wide values (integer or float). Based on evaluation of a first section—section "1" 425 from array 417, a bit array b' 420 may be defined to include bit values corresponding to the evaluation results for the values from section "1" 425. The bit array b' 420 corresponds to the section "1" 425 from the values of column "b" 410. The bit array b' 420 may be divided into sections of 8 number (of 32 bit size) to correspond to 8 bit sections defined in the SIMD register 407. The bit array b' 420 may be stored as a bit vector "1" 430 in the SIMD register 407, and based on determined values a result output data may be defined. The bit vector "1" 430 in the SIMD register 407 may be divided into register sections, such as register section 440. For example, register section 440 may include 8 bit values and be of 8 bits of size. For example, based on a position of positive bit values in the bit array b' 420, corresponding values from column "a" from the table_1 405 may be defined. Iteratively, further bit arrays may be defined to correspond to further sections defined in array 410 for column "b".

Based on the determined values for the bit array b' 420, the SIMD register may be filled in with values such as 0 or 1. The "0"-s correspond to values from b, where the condition defined in the predicate from the program instructions is not satisfied. The "1"-s correspond to values from b, where the condition defined in the predicate from the program instructions is satisfied. Based on the "1"-s, which may be interpreted as positive bit values, corresponding rows from the column "a" may be determined to generate a first set of result data for column "a"—result data set "1" 450. The result data set "1" 450 corresponds to the first section "1" 425 that is evaluated. The result data set "1" 450 may be communicated by the processor. For example, the result data set "1" 450 may be communicated via a user interface on a display screen associated with the computer system. During a second iteration, a second bit vector may be generated to replace the first bit vector in the SIMD register, where bit values evaluating a second section from the array 417 may be defined. Based on the positive bit values in the second bit vector, corresponding values from column "a" may be defined to generate a second result data set of 256 result values from column "a".

Iteratively, all of the sections defined in the array 410 may be evaluated to determine bit vectors, such as bit vector "1" 430 to be stored one after another into the SIMD register of the processor. In such iterative manner, the results that are provided are provided in pieces, based on the results generated in the SIMD register. Therefore, the results from the evaluation of a given section from column "b" may not be pushed back into the main memory of the computing environment.

The process of evaluating a request may be related to a complex predicate including one or more simple predicates (e.g. the one described above "b>100") for evaluation of data from a database table. For example, a complex predicate may be in the following for: WHERE (s>10 AND t<20) OR (u=30 AND v>40). The parameters s, t, u, and v may be denoting columns from the database table. The exemplary complex predicate includes four simple predicates. For such a complex predicate, a bit vector b1 of size 256 for the first predicate "s>10", and a bit vector b2 of size 256 for the second predicate "t<20", and so on for b3 and b4. Then, the four bit vectors can be taken and do the junctions in a "SIMD" fashion. SIMD operations may be performed where there are defined junctions in the originally defined complex predicate. For example, the performed SIMD operations may be performed over the bit vectors such as (b1 SIMD_AND b2) SIMD_OR (b3 SIMD_AND b4). In such a manner, the "AND" and "OR" operations for 256 rows are performed with only 3 SIMD instructions, instead of 256*3 instructions required to be executed if performed in a scalar manner. Since the predicate evaluation is closely coupled with the rest of the execution, table data and bit vectors are not transferred up and down through the cache levels.

Figure 5:
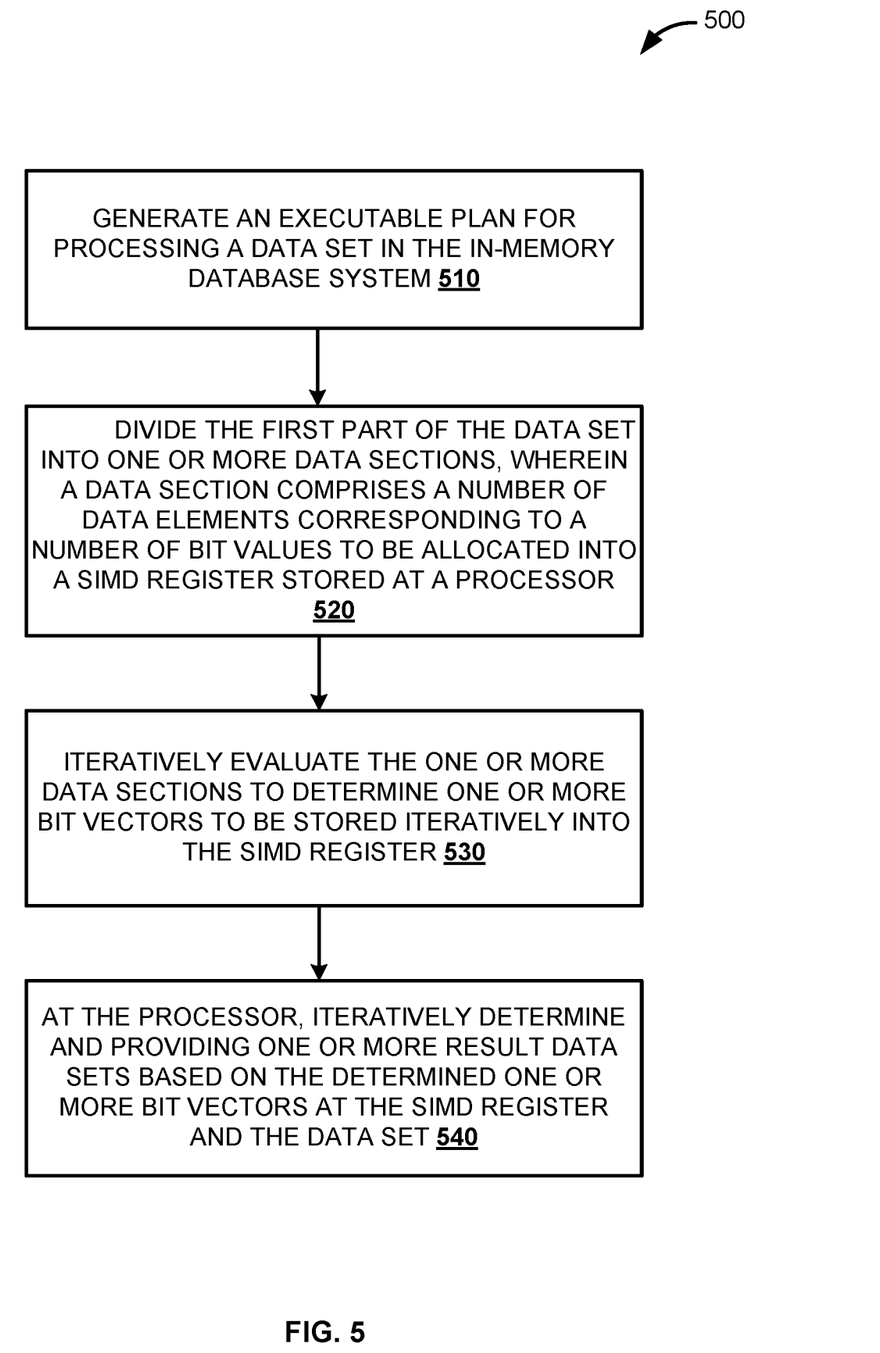
FIG. 5 is a flow diagram illustrating a process for iterative evaluation of data through processor registers, according to one embodiment.

FIG. 5 is a flow diagram illustrating a process 500 for iterative evaluation of data through processor registers, according to one embodiment. At 510, an executable plan is generated for processing a data set in an in-memory database system. The executable plan is associated with code generation for processing data through SIMD registers in the processor of the in-memory database system. The executable plan is associated with runtime generated program instructions. The runtime generated program instructions are defined based on source code including a predicate associated with a first part of the data set. The runtime generated program instructions may be based on a received request including a query for the data set. The query may define the predicate associated with the first part of the data set. For example, the data set may be a database table, such as the presented table in Table 2. The runtime generated program instructions may be based on program statements included in a software application. The first part of the data set may be one or more columns from the database table. With the exemplary query in Table 1, the first part of the data set associated with a predicate is the data from column "b", and the predicate is the verification statement whether a value from column "b" is higher or not than 100.

At 520, the first part of the data set is divided into one or more data sections. A data section comprises a number of data elements corresponding to a number of bit values that may be allocated into a register stored at a processor. The first part of the data set may be divided into a number of equal of size blocks corresponding to the defined data sections at 520. The register at the process, which may be used for process 500 may be a register associated with performing single instructions on multiple data (SIMD register). The size of the SIMD register may be determined before the execution plan is generated. The size of the SIMD register may be used to determine the number of values to be included in a data section. Values from the data sections are evaluation iteratively based on the predicate defined in the program instructions. A data section may be such as section "1" 425, FIG. 4. In the exemplary query from Table 1 applied over the data from Table 2, the evaluation of the predicate may be stored as a bit values, e.g. 0 or 1, in a bit vector. The bit vector may be such as the bit vector "1" 430. For example, if the SIMD register has a size of 256 bits, then 256 numbers from the first part of the data set may be evaluated to determine 256 evaluation results presented in bit values.

At 530, the one or more data sections defined for the first part of the data are iteratively evaluated to determine one or more bit vectors. The one or more bit vectors are stored iteratively into the SIMD register at the processor At 540, at the processor, one or more result data sets are determined and provided iteratively. The determination of the one or more result data sets is based on the determined one or more bit vectors at the SIMD register and is based also on the data set. A result data set is determined based on positive bit values in the corresponding bit vector defined for a current iteration. When positive bit values are determined, corresponding row identifier from the data set may be determined. Such row identifiers may be used to determine values from the data set that are used for generating the result data as defined by the program instructions. For example, with instructions based on the query from Table 1, row identifiers for table 2 may be determined based on iterative evaluation of sections from column "b" according to the predicate (b>100). Such row identifiers may be used to determine, which values from column "a" are to be included in a result data set, as defined in the query (Select a). In another example, the result data may be a derivative of the values stored in the data set.

Figure 6:
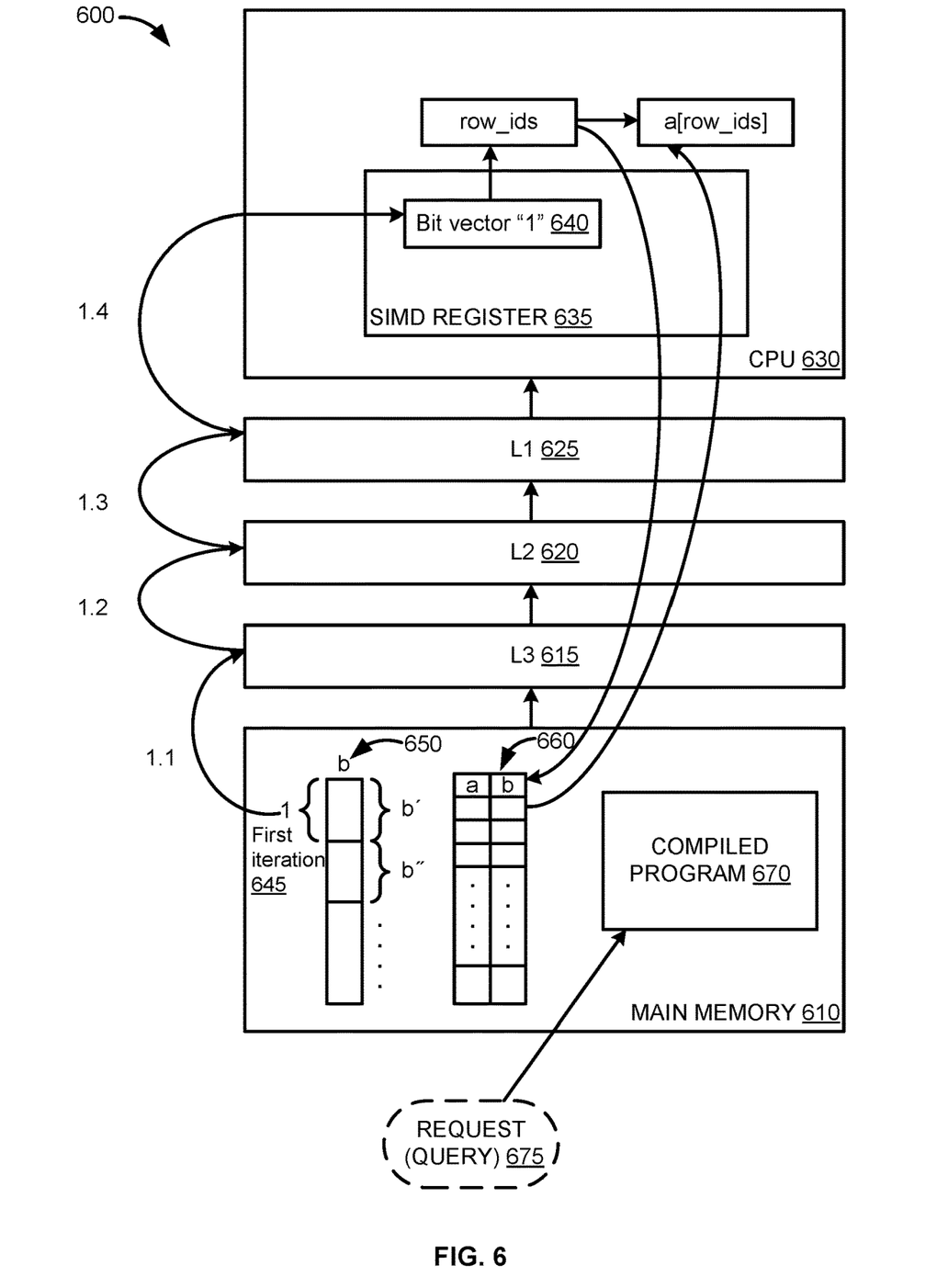
FIG. 6 is a block diagram illustrating a system for executing program instructions related to operations over a data set through processor registers, according to one embodiment.

FIG. 6 is a block diagram illustrating a system 600 for executing program instructions related to operations over a data set through processor registers, according to one embodiment. The system 600 includes main memory 610, three cache memory levels—L1 625, L2 620, and L3 615, and a CPU 630. The main memory 610 includes a compiled program 670 that is generated based on a received request 675. The received request 675 may be such as the request 305, FIG. 3. Based on the received request 675 including a query for a data stored in Table 660 on the main memory 610, program instructions may be generated. The program instructions may be such as the program instructions 125, FIG. 1. The compiled program 670 may be generated based on such program instructions. The compiled program 670 may be generated by an execution engine, such as the execution engine 175, FIG. 1. The compiled program 670 may be associated with the table 660. The table 660 includes a set of columns, for example—column "a", and column "b". The table 660 may be such as the Table 2 presented above. The compile program 670 may define how to use data from the data set in table 660 to generate result data and provide it to an end user. The generated result data may be provided through the CPU 630.

In one embodiment, a column from the table 660 may be associated with a predicate defined in the compiled program 670. The column may be column "b". The predicate may be defined in the request (query) 675. For example, a query request may be defined as an SQL string: "select a, where b>100, from table_1". Column "b" may be evaluated iteratively in sections during executing runtime generated code for the program 670. The iterative evaluation of the data in column "b" is performed according to the defined predicate to determine whether the values comply with the predicate. The values in column "b" may be divided into sections, so that result bit values from evaluation of a section may fit into a SIMD register 635 at the CPU 630. The section size, namely the number of values from column "b", may be defined to corresponds to the size of the SIMD register 635. In such manner, sections such as b' and b" may be defined. At a first iteration 645, a first section from column "b" 650 may be evaluated based on the program instructions. The values from the first section may be evaluated to determine whether they comply with the defined predicate. The evaluation of the values during the first iteration utilize the cache memory levels L1 625, L2 620, and L3 615, to store data through intermediate operations. The evaluation results for the first section during the first iteration 645, are stored at bit vector "1" 640 at the SIMD register. The bit vector "1" 640 may be such as the bit vector "1" 430 on FIG. 4. Based on the values stored at the bit vector "1" 640, row identifiers corresponding to rows from table 660 may be defined. The row identifiers (row_ids), which may be determined are associated with positive bit values from the bit vector "1" 640, which correspond to rows in the table 660 where the predicate is satisfied. When such row identifiers are determined for the first iteration, the table 660 may be queried to provide a first result data set corresponding to the first section of column "b" 650. The first results data set may be invoked from the main memory and provided through the CPU 630. The first result data set may include values from column "a", which values are invoked based on determined row identifiers.

At a subsequent iteration, the SIMD register 635 may erase the previously stored bit vector "1" 640 and allow for a subsequent bit vector to be stored there. During a subsequent iteration, the row identifiers that are to be determined may not correspond to the consecutive number of a value from the bit vector. A formula may be used to determine the row identifiers, which are associated with the initial database table 660. There is a correlation between the position of the values at the bit vector, the subsequent number of the iteration, and the position of values in the database 660. For example, formula (1) may be used to determine iteratively the row identifiers for rows corresponding to positive bit values in bit vectors. In the exemplary formula (1), the number of stored values in a bit vector is 256, when the SIMD register 635 size is 256 bits.

(1) row_id=i*256+j, where "i" is the subsequent number of the iteration, where "i" starts from 0 to n, and "j" is the position of the positive bit value in the bit vector.

In iterative manner, result data sets may be provided iteratively through subsequent querying the table 660. Therefore, evaluation of data for column "b" 650 as stored in the resulting bit vectors (e.g. result vector "1" 430 from FIG. 4) may not be pushed back and forth from the CPU 630 to the main memory 610 to determine the whole result set at a final iteration. Through utilizing the SIMD register 635, the performance of the evaluation of values from the database table based on the program instructions is enhanced. The close coupling of the SIMD scanning of data with the fetching of data during execution via code generation improves the performance of evaluation. Avoiding pushing data back and forth from the CPU 630 to the main memory 610 optimizes the process of evaluation of values from the database table.

Figure 7:
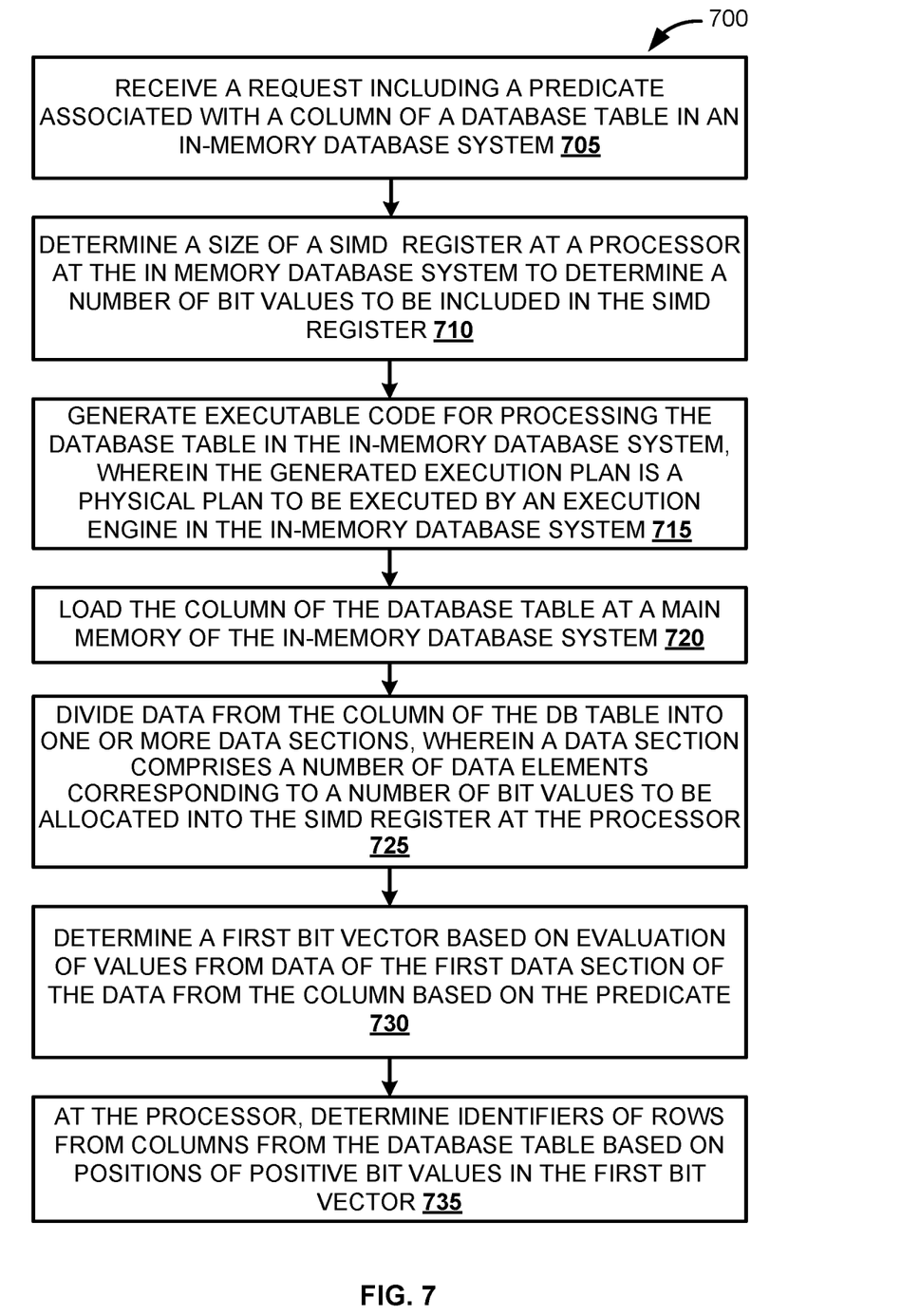
FIG. 7 is a flow diagram illustrating a process for evaluating a request related to operations over a data set through generating bit vectors at a computer processor for determining result data, according to one embodiment.

FIG. 7 is a flow diagram illustrating a process 700 for evaluating a request related to operations over a data set through generating bit vectors at a computer processor for determining result data, according to one embodiment. At 705, the request are received in an in-memory database system. The request includes a predicate associated with a column of a database table including the data set. At 710, a size of a SIMD register at a processor in the in-memory database system is determined. The size of the SIMD register is determined in order to determine a number of bit values to be included in the SIMD register. At 715, executable code is generated for processing the database table in the in-memory database system. The executable plan is a physical plan that is to be executed by an execution engine associated with the in-memory database system. At 720, the column of the database table, associated with the predicate, is loaded at a main memory of the in-memory database system. The main memory may be such as the main memory 610, FIG. 6. The program instructions are stored at the main memory of the in-memory database system. At 725, data from the column of the database table is divided into one or more data sections. A data section comprises a number of data elements, which number corresponds to a number of bit values to be allocated into the SIMD register at the processor. At 730, a first bit vector is determined, which first bit vector is determined based on evaluation of values from data of a first data section of the data from the column. The evaluation is performed based on the predicate defined in the program instructions. The first bit vector comprises bit values, e.g. 0 and 1, corresponding to evaluation results for compliance of values from the first data section with the predicate. At the processor, the first bit vector is loaded into the SIMD register. At 735, identifiers of rows from columns from the database table are determined. The identifiers (ids) of rows correspond to rows from the database table, where the predicate is satisfied. For example, in the example of FIG. 4, values from column "a" from determined rows corresponding to the determined row ids, where values from column "b" are higher than 100.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
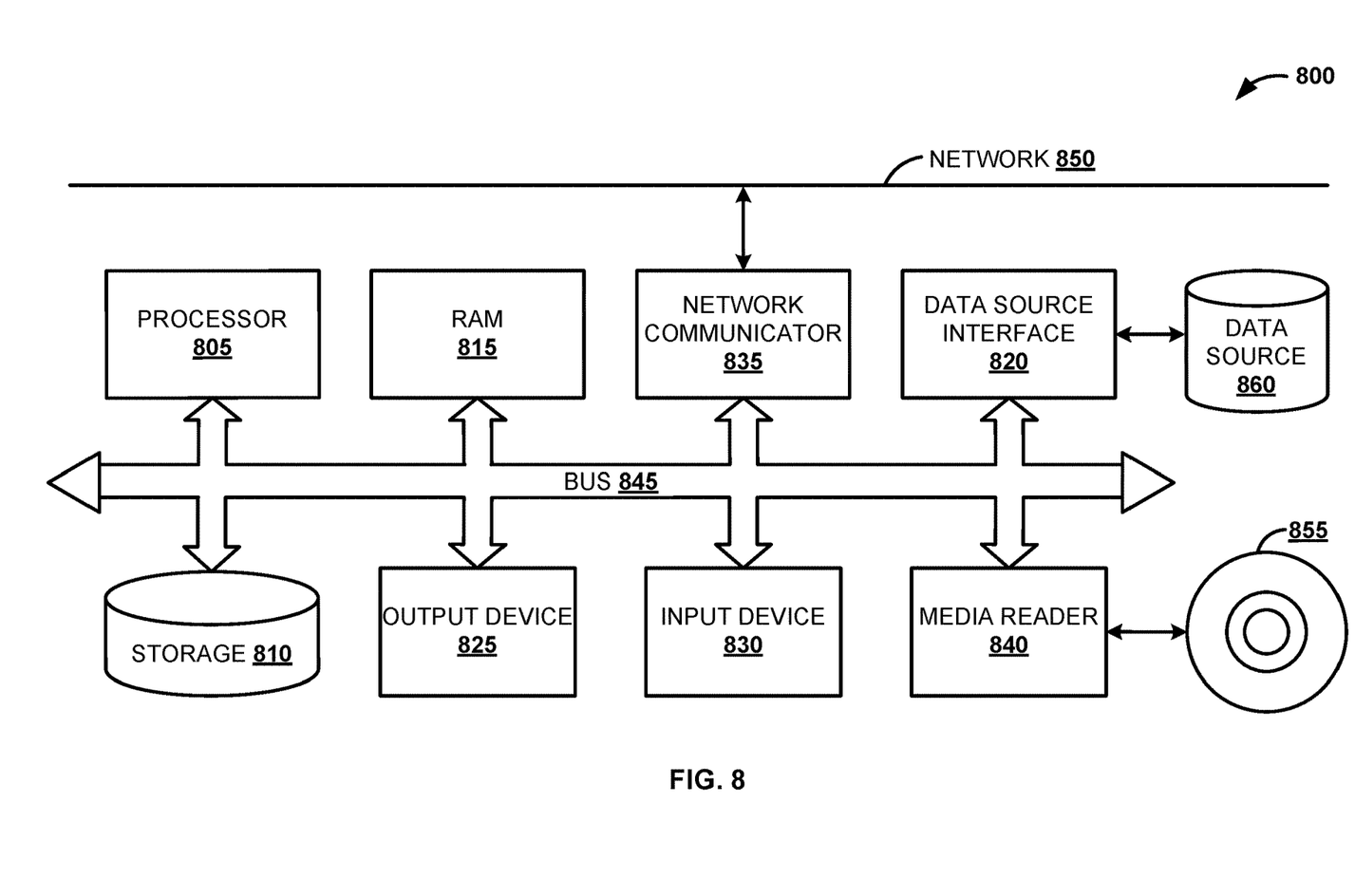
FIG. 8 is a block diagram illustrating an embodiment of a computing environment in which the techniques described for evaluating data associated with a program in an in-memory database system can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to evaluate data in an in-memory database system, the method comprising:
   in response to receiving a query for a data set, generating executable code at runtime to process the data set in the in-memory database system, wherein the executable code is based on program instructions including a predicate associated with a first part of the data set;
   executing the executable code to divide the first part of the data set into two or more data sections and to determine two or more bit arrays of data elements, wherein a data section comprises a number of data elements corresponding to a number of bit values to be allocated into a register at a processor, and each of the two or more bit arrays corresponds to one of the two or more data sections;
   at the processor, iteratively evaluating the two or more bit arrays to determine two or more bit vectors to be stored iteratively into the register, wherein each bit of the two or more bit vectors corresponds to a different data element of the two or more bit arrays; and
   at the processor, iteratively determining and providing one or more result data sets based on the stored two or more bit vectors and based on invoking data from the data set.

2. The method of claim 1, wherein the register at the processor is associated with performing single instructions on multiple data elements in parallel.

3. The method of claim 2, further comprising:
   determining a size of the register at the processor to determine the number of bit values to be allocated.

4. The method of claim 2, further comprising:
   loading the data set in a database table at a main memory of the in-memory database system to be processed according to the executable code.

5. The method of claim 2, wherein the first part of the data set includes one or more columns of data from the data set, and wherein the predicate included in the program instructions defines rules for determining the one or more result data sets.

6. The method of claim 1, wherein iteratively evaluating the one or more data sections to determine the one or more bit vectors to be stored iteratively into the register further comprising:
   determining a first bit vector based on evaluation of values from the first part of the data set based on the predicate, wherein the first bit vector comprises bit values corresponding to evaluation results for compliance with the predicate;
   at the processor, loading the first bit vector into the register; and
   at the processor, determining identifiers of rows from columns from the data set based on positions of positive bit values in the first bit vector.

7. The method of claim 1, further comprising:
   generating a request defining an operation to be performed on the data set; and
   generating a logical plan for the request, the logical plan defining a data flow of logical operations related to the program instructions and the data set;
   wherein the generated execution plan is a physical plan corresponding to the logical plan to be executed by an execution engine in the in-memory database system, where the execution plan is determined based on a selection from a set of determined physical plans corresponding to the generated logical plan, wherein the set of determined physical plans is determined based on information about system capabilities of the in-memory database system the execution used and based on statistical data for the data set.

8. The method of claim 7, wherein generating the logical plan for the program instructions further comprise:
parsing the request to generate a syntax tree for performing the operation;
validating the syntax tree to determine whether the syntax tree is valid for the data set; and
when the syntax tree is valid for the data set, enhancing the syntax tree to include information about the data set.

9. A computer system to evaluate data in an in-memory database system comprising:
a processor;
a memory in association with the processor storing instructions to:
responsive to receipt of a query for a data set, generate executable code at runtime to process the data set in the in-memory database system, wherein the executable code is based on program instructions including a predicate associated with a first part of the data set;
executing the executable code to divide the first part of the data set into two or more data sections and to determine two or more bit arrays of data elements, wherein a data section comprises a number of data elements corresponding to a number of bit values to be allocated into a register at the processor, and each of the two or more bit arrays corresponds to one of the two or more data sections;
iteratively evaluate the two or more bit arrays to determine two or more bit vectors to be stored iteratively into the register, wherein each bit of the two or more bit vectors corresponds to a different data element of the two or more bit arrays, the register at the processor being associated with performing single instructions on multiple data elements in parallel; and
at the processor, iteratively determine and provide one or more result data sets based on the stored one or more bit vectors and based on invoking data from the data set.

10. The system of claim 9, wherein the memory further comprises instructions to:
determine a size of the register at the processor to determine the number of bit values to be allocated; and
load the data set in a database table at a main memory of the in-memory database system to be processed according to the executable code.

11. The system of claim 9, wherein the first part of the data set includes one or more columns of data from the data set, and wherein the predicate included in the program instructions defines rules for determining the one or more result data sets.

12. The system of claim 9, wherein the instructions to iteratively evaluate the one or more data sections to determine the one or more bit vectors to be stored iteratively into the register further comprise instructions to:
determine a first bit vector based on evaluation of values from the first part of the data set based on the predicate, wherein the first bit vector comprises bit values corresponding to evaluation results for compliance with the predicate;
load the first bit vector into the register at the processor; and
at the processor, determine identifiers of rows from columns from the data set based on positions of positive bit values in the first bit vector.

13. The system of claim 9, wherein the memory further comprises instructions to:
receive a request defining an operation to be performed on the data set; and
generate a logical plan for the request, the logical plan defining a data flow of logical operations related to the program instructions and the data set;
wherein the generated execution plan is a physical plan corresponding to the logical plan to be executed by an execution engine in the in-memory database system, where the execution plan is determined based on a selection from a set of determined physical plans corresponding to the generated logical plan, wherein the set of determined physical plans is determined based on information about system capabilities of the in-memory database system the execution used and based on statistical data for the data set.

14. The system of claim 13, wherein the instructions to generate the logical plan for the program instructions further comprise instructions to:
parse the request to generate a syntax tree for performing the operation;
validate the syntax tree to determine whether the syntax tree is valid for the data set; and
when the syntax tree is valid for the data set, enhance the syntax tree to include information about the data set.

15. A non-transitory computer-readable medium storing instructions, which when executed cause a computer system to:
in response to receiving a query for a data set, generate executable code at runtime to process the data set in the in-memory database system, wherein the executable code is based on program instructions including a predicate associated with a first part of the data set;
executing the executable code to divide the first part of the data set into two or more data sections and to determine two or more bit arrays of data elements, wherein each bit of the two or more bit vectors corresponds to a different data element of the two or more bit arrays, a data section comprising a number of data elements corresponding to a number of bit values to be allocated into a register at the processor, and each of the two or more bit arrays corresponding to one of the two or more data sections;
iteratively evaluate the two or more data sections to determine two or more bit vectors to be stored iteratively into the register, wherein the register at the processor is associated with performing single instructions on multiple data elements in parallel; and
at the processor, iteratively determine and provide one or more result data sets based on the stored two or more bit vectors and based on invoking data from the data set.

16. The computer-readable medium of claim 15, further comprising instructions, which when executed cause the computer system to:
determine a size of the register at the processor to determine the number of bit values to be allocated; and
load the data set in a database table at a main memory of the in-memory database system to be processed according to the executable code.

17. The computer-readable medium of claim 15, wherein the first part of the data set includes one or more columns of data from the data set, and wherein the predicate included in the program instructions defines rules for determining the one or more result data sets.

18. The computer-readable medium of claim 15, wherein the instructions to iteratively evaluate the one or more data sections to determine the one or more bit vectors to be stored iteratively into the register further comprise instructions, which when executed cause the computer system to:
- determine a first bit vector based on evaluation of values from the first part of the data set based on the predicate, wherein the first bit vector comprises bit values corresponding to evaluation results for compliance with the predicate;
- load the first bit vector into the register at the processor; and
- at the processor, determine identifiers of rows from columns from the data set based on positions of positive bit values in the first bit vector.

19. The computer-readable medium of claim 15, further comprising instructions, which when executed cause the computer system to:
- receive a request defining an operation to be performed on the data set; and
- generate a logical plan for the request, the logical plan defining a data flow of logical operations related to the program instructions and the data set;
- wherein the generated execution plan is a physical plan corresponding to the logical plan to be executed by an execution engine in the in-memory database system, where the execution plan is determined based on a selection from a set of determined physical plans corresponding to the generated logical plan, wherein the set of determined physical plans is determined based on information about system capabilities of the in-memory database system the execution used and based on statistical data for the data set.

20. The computer-readable medium of claim 19, wherein the instructions to generate the logical plan for the program instructions further comprise instructions, which when executed cause the computer system to:
- parse the request to generate a syntax tree for performing the operation;
- validate the syntax tree to determine whether the syntax tree is valid for the data set; and
- when the syntax tree is valid for the data set, enhance the syntax tree to include information about the data set.

* * * * *